United States Patent
Masumura et al.

(10) Patent No.: US 10,951,140 B2
(45) Date of Patent: Mar. 16, 2021

(54) SYNCHRONOUS MOTOR DRIVE DEVICE, AIR-SENDING DEVICE AND AIR-CONDITIONING DEVICE

(71) Applicant: Mitsubishi Electric Corporation, Tokyo (JP)

(72) Inventors: Tsukasa Masumura, Tokyo (JP); Kenji Takahashi, Tokyo (JP); Yasuhiko Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/489,767

(22) PCT Filed: Apr. 5, 2017

(86) PCT No.: PCT/JP2017/014235
§ 371 (c)(1),
(2) Date: Aug. 29, 2019

(87) PCT Pub. No.: WO2018/185878
PCT Pub. Date: Oct. 11, 2018

(65) Prior Publication Data
US 2020/0244194 A1 Jul. 30, 2020

(51) Int. Cl.
*H02P 6/00* (2016.01)
*H02P 6/04* (2016.01)
*F25B 49/02* (2006.01)

(52) U.S. Cl.
CPC ............ *H02P 6/04* (2013.01); *F25B 49/025* (2013.01)

(58) Field of Classification Search
CPC .. H02P 5/74; H02P 25/064; H02P 5/46; H02P 5/68
See application file for complete search history.

(56) References Cited

U.S. PATENT DOCUMENTS

2009/0309529 A1* 12/2009 Shoda ............... H02P 5/74
                                                    318/490
2014/0132197 A1  5/2014 Kanazawa et al.
2015/0229245 A1  8/2015 Cho et al.

FOREIGN PATENT DOCUMENTS

JP   H11-089259 A   3/1999
JP   2999451 B2    1/2000
(Continued)

OTHER PUBLICATIONS

Extended European Search Report dated Dec. 13, 2019 issued in corresponding EP patent application No. 17904733.7.
(Continued)

*Primary Examiner* — Karen Masih
(74) *Attorney, Agent, or Firm* — Posz Law Group, PLC (57) ABSTRACT

A synchronous motor drive device drives a plurality of synchronous motors, and includes a power converter that converts power to supply power to the plurality of synchronous motors, a first switch device that electrically connects or disconnects between the power converter and each of the plurality of synchronous motors, and a controller that, based on a higher order command, performs stability judgment processing of the plurality of synchronous motors, determines the number of synchronous motors to be driven and a drive speed from among the plurality of synchronous motors, selects a synchronous motor corresponding to the number of the synchronous motors from among the plurality of synchronous motors, controls the first switch device corresponding to the selected synchronous motor to electrically connect the power converter to the synchronous motor and to supply the power, and instructs, to the power converter, the drive speed of the synchronous motor to be driven.

11 Claims, 6 Drawing Sheets

(56) References Cited

FOREIGN PATENT DOCUMENTS

| | | |
|---|---|---|
| JP | 2001-129293 A | 5/2001 |
| JP | 2004-350385 A | 12/2004 |
| JP | 2006-081258 A | 3/2006 |
| JP | 2007-259554 A | 10/2007 |
| JP | 2009-254114 A | 10/2009 |
| JP | 4625664 B2 | 2/2011 |
| JP | 2011-045172 A | 3/2011 |
| JP | 2012-060701 A | 3/2012 |
| JP | 2015-023621 A | 2/2015 |

OTHER PUBLICATIONS

International Search Report of the International Searching Authority dated Jun. 27, 2017 for the corresponding International application No. PCT/JP2017/014235 (and English translation).
Office Action dated May 19, 2020 issued in corresponding JP patent application No. 2019-510561 (and English translation).
Office Action dated Aug. 11, 2020 issued in corresponding JP patent application No. 2019-510561 (and English translation).

\* cited by examiner

| INPUT | OUTPUT | |
|---|---|---|
| WORK AMOUNT [W] | MOTOR M1 SPEED (rpm) | MOTOR M1, M2 SPEED (rpm) |
| 100 | 100 | |
| 200 | 200 | |
| 300 | 300 | |
| 400 | 400 | |
| 500 | 500 | |
| 600 | | 300 |
| 700 | | 350 |
| 800 | | 400 |
| 900 | | 450 |
| 1000 | | 500 |
| 1100 | | 550 |
| 1200 | | 600 |
| 1300 | | 650 |
| 1400 | | 700 |
| 1500 | | 750 |

| INPUT | OUTPUT | |
|---|---|---|
| WORK AMOUNT [W] | MOTOR M1 SPEED (rpm) | MOTOR M1, M2 SPEED (rpm) |
| 100 | 100 | |
| 200 | 200 | |
| 300 | 300 | |
| 400 | 400 | 200 |
| 500 | 500 | 250 |
| 600 | 600 | 300 |
| 700 | 700 | 350 |
| 800 | 800 | 400 |
| 900 | 900 | 450 |
| 1000 | 1000 | 500 |
| 1100 | 1100 | 550 |
| 1200 | 1200 | 600 |
| 1300 | 1300 | 650 |
| 1400 | 1400 | 700 |
| 1500 | 1500 | 750 |

SYNCHRONOUS MOTOR DRIVE DEVICE, AIR-SENDING DEVICE AND AIR-CONDITIONING DEVICE

CROSS REFERENCE TO RELATED APPLICATION

This application is a U.S. national stage application of PCT/JP2017/014235 filed on Apr. 5, 2017, the contents of which are incorporated herein by reference.

TECHNICAL FIELD

The present invention relates to a synchronous motor drive device that drives a plurality of brushless synchronous motors with one power converter, an air-sending device having this drive device, and an air-conditioning device.

BACKGROUND ART

Heretofore, a brushless synchronous motor has been configured to be contactless. Thus, the motor has various advantages, and is therefore used in any situation. However, when a plurality of brushless synchronous motors are used, the motors may be more disadvantageous than a plurality of induction motors, in terms of cost of a motor drive device.

The induction motors have a property of generating torque due to a difference between a frequency of an AC power source and a motor rotation frequency. Therefore, even when the plurality of induction motors are connected in parallel to one AC power source, the motors can be easily driven. Consequently, when the number of the induction motors increases, a capacity of the power source increases, but it is not necessary to increase the number of the power sources. Since the number of components does not increase excessively, an excessive increase in cost of the power source is suppressed.

On the other hand, it is not easy to arrange the brushless synchronous motors in a parallel drive system that drives the plurality of motors connected in parallel to one AC power source. The brushless synchronous motors step out, when a voltage and a current synchronized with a magnetic pole position of a rotor are not applied. Therefore, there is generally used, a single drive system that drives a single motor by using one motor uses one AC power source per motor. Consequently, when the number of the brushless synchronous motors increases, the number of the power sources accordingly has to increase. Thus, the number of components also increases, thereby increasing the cost of the power source. To suppress the cost of the power source, various suggestions have been made. Here, as the AC power source for the driving of the brushless synchronous motors, a device having an inverter circuit configuration is most general, but the device may have another circuit configuration such as a cycloconverter or a matrix converter.

For example, there has been proposed a drive device that simultaneously drives two or more brushless synchronous motors connected in series to one power source (e.g., see Patent Literature 1). There has been further proposed a drive device that does not simultaneously drive two or more brushless synchronous motors connected in parallel to one power source, and switches the motors that are loads to be driven (e.g., see Patent Literature 2). There is also a drive device that simultaneously drives two or more brushless synchronous motors connected in parallel to one power source. For example, a drive method includes driving a plurality of sensorless motors connected in parallel to one inverter device so that each motor can start at an optional timing (e.g., see Patent Literature 3). Additionally, there is, for example, a drive device that drives a plurality of motors connected in parallel to one inverter device so that a freely rotated motor does not constitute a load of another motor (e.g., see Patent Literature 4). In addition, there is, for example, a motor drive device that can always drive a plurality of motors connected in parallel to one inverter device (e.g., see Patent Literature 5). Furthermore, there is, for example, a motor drive device that can successively start a plurality of motors connected in parallel to one inverter device (e.g., see Patent Literature 6).

CITATION LIST

Patent Literature

Patent Literature 1: Japanese Patent No. 4625664
Patent Literature 2: Japanese Unexamined Patent Application Publication No. 2001-129293
Patent Literature 3: Japanese Patent No. 2999451
Patent Literature 4: Japanese Unexamined Patent Application Publication No. 2007-259554
Patent Literature 5: Japanese Unexamined Patent Application Publication No. 2015-023621
Patent Literature 6: Japanese Unexamined Patent Application Publication No. H11-089259

SUMMARY OF INVENTION

Technical Problem

However, in actual situation, a parallel drive system that drives a plurality of brushless synchronous motors in parallel is noticeably inferior to a single drive system, in terms of stability. For example, when the plurality of brushless synchronous motors are driven in parallel, the motors can be often driven comparatively stably in a high speed rotation region. However, in a low speed rotation region, hunting easily occurs, and a current, speed and the like often pulsate and are not stable. Consequently, in order to allow the motors to be driven stably, a drive range is restricted. Here, for example, in the motor that drives a fan used in an air-conditioning device, a plurality of fans can be preferably driven to cope with a large amount of air to be sent (amount of work).

The present invention has been attained to solve such problems as described above, and an object thereof is to provide a synchronous motor drive device that can stably drive synchronous motors, an air-sending device, and an air-conditioning device.

Solution to Problem

A synchronous motor drive device according to one embodiment of the present invention drives a plurality of synchronous motors connected in parallel to one another, and this synchronous motor drive device includes a power converter that converts power from a power source to supply the power to the plurality of synchronous motors, a first switch device that electrically connects or disconnects the power converter and each of the plurality of synchronous motors, and a controller that, based on a higher order command, performs stability judgment processing of the plurality of synchronous motors, determines the number of synchronous motors to be driven and a drive speed from among the plurality of synchronous motors, selects a synchronous motor corresponding to the number of the synchronous motors to be driven from among the plurality of synchronous motors, controls the first switch device corresponding to the selected synchronous motor to electrically connect the power converter to the synchronous motor and to supply the power, and instructs, to the power converter, the drive speed of the synchronous motor to be driven.

Advantageous Effects of Invention

According to one embodiment of the present invention, a controller controls a first switch device to electrically connect, to a power converter, a stably drivable synchronous motor selected from a plurality of synchronous motors connected in parallel to one another, so that power is supplied to achieve a determined drive speed. Consequently, an optional number of motors can be driven at an optional drive speed. It is not necessary to drive all the synchronous motors connected in parallel at a low speed, and the optional number of the motors driven may be driven at the optional drive speed. Consequently, the motors can be driven stably.

DESCRIPTION OF EMBODIMENTS

Embodiments of the present invention will be described hereinafter with reference to drawings. Here, in the following drawings, similar reference numbers refer to similar components or corresponding components and are common through the following descriptions of the embodiments. Furthermore, configurations of constitutional elements described herein are merely illustrations and are not limited thereto. In particular, combinations of the constitutional elements are not limited only to combinations of the embodiments, and the constitutional element described in another embodiment can be suitably applied to still another embodiment. Additionally, it is not particularly determined whether a voltage is high or low, in accordance with a relation with an absolute value, and it is relatively determined whether the voltage is high or low, in accordance with, for example, a state or an operation in a system or a device. In addition, for example, when a plurality of devices of the same type distinguished with subscripts do not especially have to be distinguished or specified, the subscripts may be omitted in describing the devices.

Embodiment 1

Figure 1:
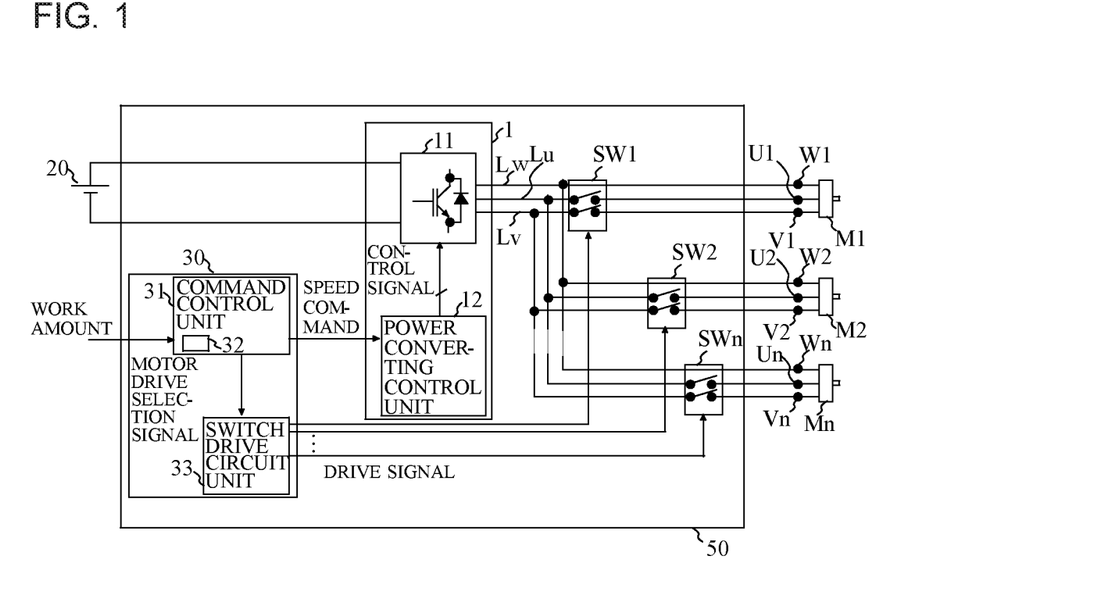
FIG. 1 is a diagram showing an example of a system configuration mainly including a synchronous motor drive device 50 according to Embodiment 1 of the present invention.

FIG. 1 is a diagram showing an example of a system configuration mainly including a synchronous motor drive device 50 according to Embodiment 1 of the present invention. As shown in FIG. 1, the synchronous motor drive device 50 is a device that converts power supplied from a DC voltage power source 20, and supplies the power to a plurality of brushless synchronous motors M1, M2 to Mn connected in parallel to one another, to drive the motors. The brushless synchronous motors M1, M2 to Mn shown in FIG. 1 are multiphase AC motors. Here, three-phase brushless synchronous motors each having a terminal U, a terminal V and a terminal W of U-phase, V-phase and W-phase will be described. Here, in general, information on a magnetic pole position is required to drive the brushless synchronous motors. Therefore, a position sensor (not shown) may be used to obtain the magnetic pole position information. Alternatively, a magnetic pole position estimation unit (not shown) may estimate the magnetic pole position information from, for example, a voltage, a current, or an electric constant of each brushless synchronous motor. Furthermore, the magnetic pole position information may be estimated, for example, by using dependence of inductance of the brushless synchronous motor on the magnetic pole position. Hereinafter, the brushless synchronous motors will be described simply as the motors.

The synchronous motor drive device 50 has switches SW1, SW2 to SWn corresponding to the motors M1, M2 to Mn as first switch devices as described later. Here, when the motors M1, M2 to Mn are not specified, description will be made as to the motors M. Similarly, the switches SW1, SW2 to SWn will be described as the switches SW. Furthermore, the synchronous motor drive device 50 can be applied to two or more motors M1 to Mn connected in parallel, but hereinafter, to simplify description, the description will be made as to two motors M1 and M2 connected in parallel unless otherwise described. A specific example of a device having the synchronous motor drive device 50 is an outdoor unit having a plurality of fans that send air to a heat exchanger of an air-conditioning device. The plurality of fans are driven by the respective motors M.

The synchronous motor drive device 50 has a power converter 1, a controller 30 and the switches SW. The power converter 1 is connected to the respective phases of the motors M in a parallel relation via connection lines Lu, Lv and Lw. The connection lines Lu, Lv and Lw are common on a side on which they are connected to the power converter 1. Furthermore, to connect to each motor M, each connection line branches at a branch point and connects to the terminal U, the terminal V and the terminal W of each motor M. Each switch SW switches to supply the power to the corresponding motor M or to cut off the power. In Embodiment 1, each switch SW has two switching units. Furthermore, the switching unit is disposed at and after the branch point on each of the connection lines Lu and Lv, and the power converter 1 is electrically connected to each of the U-phase and the V-phase of each motor M via the switching unit. Any switching units are not disposed on the connection line Lw, and the power converter 1 is directly connected to the W-phase of each motor M. However, this example is not restrictive, and the switching units may only be disposed in two optional connection lines in the connection lines Lu, Lv and Lw.

The power converter 1 has a power converting circuit unit 11 and a power converting control unit 12. The power converting control unit 12 sends, to the power converting circuit unit 11, a control signal to execute PWM control based on a speed command included in a signal from the controller 30. Here, when the motor M with the position sensor is used, for example, a position detecting signal from a hall sensor may be input to the power converting control unit 12.

The power converting circuit unit 11 converts the power supplied from the DC voltage power source 20, based on the control signal. In Embodiment 1, for example, the power converting circuit unit has a switching element (not shown), and a DC-AC converting inverter circuit that converts DC power to AC power. The power converting circuit unit 11 is, for example, a circuit including a pre-driver and a driver connected to the power converting control unit 12.

The driver has a plurality of semiconductor elements such as an insulated gate bipolar transistor (IGBT) and a power metal oxide semiconductor field effect transistor (MOS-FET). The inverter circuit in Embodiment 1 has a pair of a high-side upper arm and a low-side lower arm. The upper arm is connected to the DC voltage power source 20 on a positive side. Furthermore, the lower arm is connected to the DC voltage power source 20 on a negative (ground) side. Additionally, a semiconductor element that constitutes the switching element and the like is used in the arm. Here, the driver has three pairs of arms corresponding to the U-phase, V-phase and W-phase of the motor. Then, a connection point between the upper arm and the lower arm of each phase is connected to a motor side via a wire. The upper arm and the lower arm operate to switch in accordance with a pulsed signal of a pulse width modulation (PWM) signal output by the power converting control unit 12, thereby converting the DC power to the AC power. In the semiconductor element, there is used, for example, a power semiconductor containing silicon, silicon carbide, or gallium nitride as a material.

The controller 30 is a device that determines the number of the motors M to be driven, a drive speed of the motor M and others. The controller 30 of Embodiment 1 has a command control unit 31 and a switch drive circuit unit 33. The command control unit 31 determines the number of the motors to be driven (also selects the motor M to be driven) and determines the drive speed (a drive rotation speed) based on an operation signal including a command sent from a higher order operation control unit (not shown) other than the synchronous motor drive device 50. Then, the command control unit outputs a motor drive selection signal including data concerning the number of the motors to be driven and a speed command including data concerning the drive speed. The command control unit 31 has map data 32 as described later. There are not any restrictions on an instruction in the operation signal, for example, as long as the instruction includes data that can determine the number of the motors M to be driven and the drive speed. Here, an example of the data is data concerning an amount of work to be performed by driving the motor M, and a heat exchange capacity.

Furthermore, the switch drive circuit unit 33 outputs a drive signal indicating an on or off state to each switch SW, based on the motor drive selection signal from the command control unit 31. Each switch SW is a switch device that switches whether or not t the power is supplied to the corresponding motor M as described above. When the drive signal indicating the on state is sent from the switch drive circuit unit 33, the switch SW electrically connects the power converter 1 to the corresponding motor M. On the other hand, when the drive signal indicating the off state is sent, the switch SW electrically cuts off (disconnects) the power converter 1 from the corresponding motor M. The switch SW is a device having a relay, a transistor and other components (this also applies hereinafter).

The synchronous motor drive device 50 of Embodiment 1 can select one of three cases where the command control unit 31 drives both a motor M1 and a motor M2; drives one motor M (e.g., the motor M1) and stops (freely rotates) the other motor M (e.g., the motor M2); and stops both the motor M1 and the motor M2, via the switch drive circuit unit 33.

Figure 2:
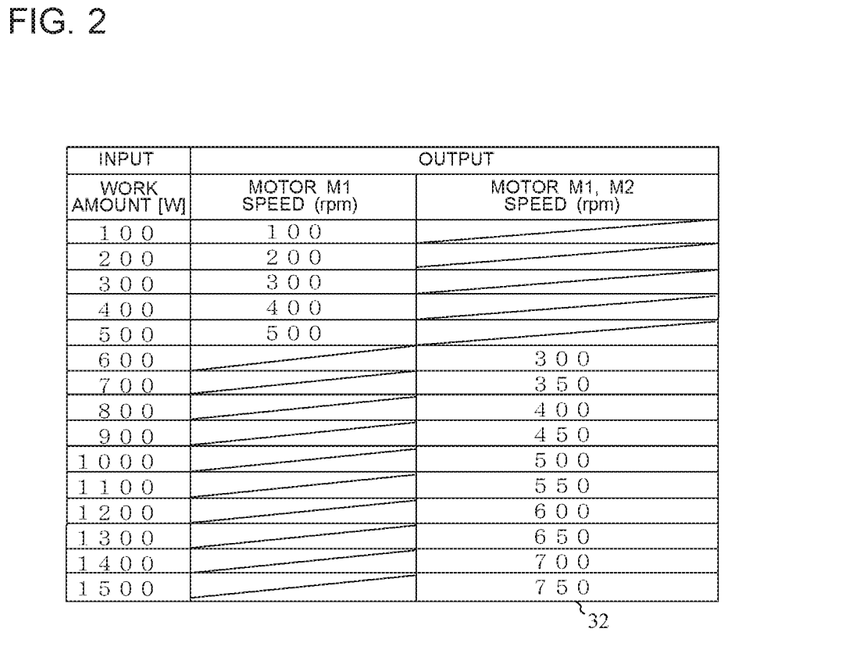
FIG. 2 is a diagram explaining content of map data 32 owned by a command control unit 31, according to Embodiment 1 of the present invention.

FIG. 2 is a diagram explaining content of the map data 32 owned by the command control unit 31, according to Embodiment 1 of the present invention. FIG. 2 shows, as a map (in a form of a table), data concerning relations of the work amount included in the operation signal with the number of the motors M to be driven and the drive speed. The relations of the work amount with the number of the motors M to be driven and the drive speed are determined in advance based on a result obtained by a test, and are shown as the data. The number of the motors M to be driven and the drive speed are determined with reference to the map data 32 based on the data of the work amount included in the operation signal. Then, the speed command including the data concerning the drive speed is sent to the power converting control unit 12 of the power converter 1. Furthermore, the motor drive selection signal including the data concerning the number of the motors M to be driven is sent to the switch drive circuit unit 33.

For example, as described above, when the synchronous motor drive device 50 is used in driving the fan that sends air to the heat exchanger of the air-conditioning device, the driving of each motor M can be controlled in one of the above described three cases in accordance with the work amount based on cooling and heating loads. Here, for example, the number of the motors M to be driven and the drive speed are optimally determined regardless of an operation environment of the air-conditioning device that includes the load, a temperature and the like. Consequently, the motors M are stably driven. Furthermore, a drive performance such as sound or loss is preferably optimized.

For example, it is preferable that the fan be driven at a rotation speed as low as possible to decrease noise or loss. However, when the plurality of motors M are driven at the low rotation speed, the motors are driven unstably, and hunting often occurs. This tendency is remarkable especially when a difference is generated in load torque applied to each motor M, when a difference is generated in temperature of each motor M, or when there is a variation in the electric constant of each motor M for a manufacturing reason. When a range of the drive speed of the motor M is narrowed to avoid the unstable driving, a performance required for equipment to be installed may not be exerted. Furthermore, when even these performance deteriorations are considered, design is complicated, and cost concerned with the device soars.

On the other hand, in the synchronous motor drive device 50 of Embodiment 1, when the plurality of motors M are driven unstably at the low rotation speed, the number of the motors M to be driven is decreased. Furthermore, the rotation speed of the motor M to be driven is increased, thereby increasing a volume of air per motor. Consequently, the motors M can be stably driven. When the motors M can be stably driven, there are advantageous effects that a required volume of air can be acquired. Additionally, it can be expected that the device is improved to solve problems of noise and loss as compared to the motors falling in an unstable state or a step-out state.

Furthermore, as to a contact configuration of each switch SW, at least one phase of a multiphase motor can be directly connected to the power converting circuit unit 11. Contacts may be provided to the remaining phases (two phases in three phases) so that the switch can turn on or off. Therefore, it is not necessary to provide the contacts in all the phases of the multiphase motor. Consequently, in each switch SW, the number of the contacts (the number of the switching units) can be decreased. Since the switch SW having a smaller number of contacts is used, component cost can be decreased. However, a configuration where the contacts are provided in all the phases is not prevented.

Here, when three or more motors M are connected in parallel, stopping of some of the motors M or stopping of all the motors M is selected. In the synchronous motor drive device 50 of Embodiment 1, each switch SW is installed between the power converter 1 and each motor M. Consequently, the controller 30 individually turns on or off the switches SW, and can selectively drive or stop one or more optional motors. For example, when the synchronous motor drive device is applied to the fan of the air-conditioning device, the fan for the heat exchanger, or other fans, driving or stopping of a plurality of fans can be arbitrarily controlled by using one power converter 1, for example, in the outdoor unit including the fan for each of a plurality of air outlets.

Embodiment 2

Figure 3:
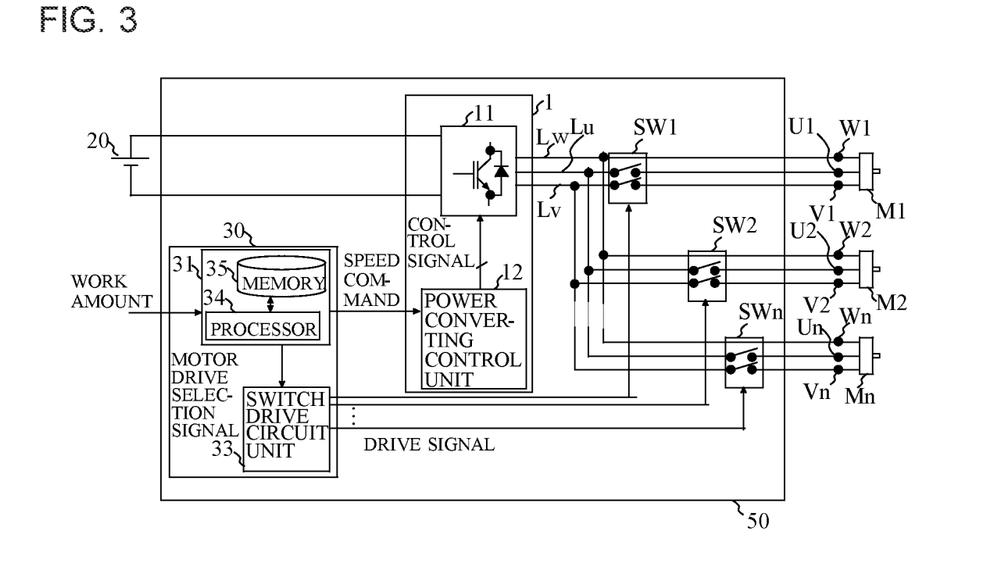
FIG. 3 is a diagram showing an example of a system configuration mainly including a synchronous motor drive device 50 according to Embodiment 2 of the present invention.

FIG. 3 is a diagram showing an example of a system configuration mainly including a synchronous motor drive device 50 according to Embodiment 2 of the present invention. In Embodiment 2, description will be made on a specific configuration especially concerned with a command control unit 31 of a controller 30. In FIG. 3, for example, equipment denoted by the same reference sign as in FIG. 1 performs an operation similar to the operation described in Embodiment 1.

The command control unit 31 includes, as hardware, at least a processor 34 constituting a processing device and a memory 35 constituting a storage device. The memory 35 stores data required for the processor 34 to perform control processing. The map data 32 described in Embodiment 1 is also stored in the memory 35. Here, the memory 35 in Embodiment 2 has both of a volatile storage device (not shown) such as a random access memory (RAM) that can temporarily store the data and a nonvolatile auxiliary storage device (not shown) such as a hard disk, or a flash memory that can store the data for a long time.

The processor 34 is a control computation processing device that executes processing based on data of a program stored in the auxiliary storage device of the memory 35. The processor 34 includes, for example, a microcomputer having a central processing unit (CPU) and other units. The program data is sent to the processor 34 from the auxiliary storage device of the memory 35 via the volatile storage device. Furthermore, the processor 34 executes the program to achieve the processing performed by the command control unit 31 in Embodiment 1. Data such as computation results obtained when the processor 34 executes the program may be stored in the volatile storage device of the memory 35 or stored in the auxiliary storage device via the volatile storage device.

Here, the processor 34 may also serve as a drive device of a motor. That is, the processor 34 may select the motor to be driven, determine the number of the motors and a speed command, and also calculate a PWM control signal so that a speed indicates a desired value.

Embodiment 3

Figure 4:
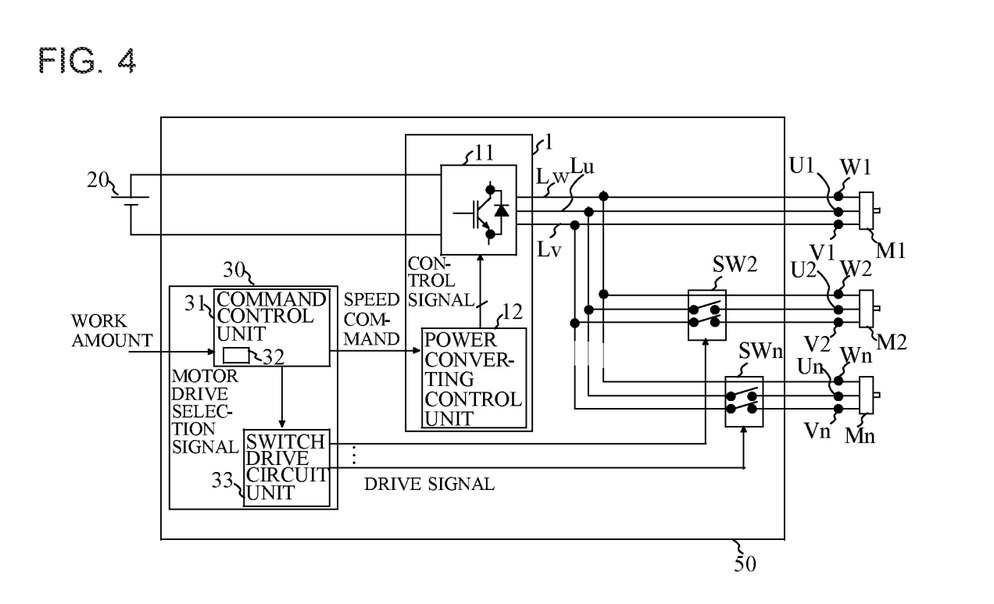
FIG. 4 is a diagram showing an example of a system configuration mainly including a synchronous motor drive device 50 according to Embodiment 3 of the present invention.

FIG. 4 is a diagram showing an example of a system configuration mainly including a synchronous motor drive device 50 according to Embodiment 3 of the present invention. In FIG. 4, for example, equipment denoted by the same reference sign as in FIG. 1 performs an operation similar to the operation described in Embodiment 1. In the synchronous motor drive device 50 in Embodiment 3, a switch SW1 installed between a power converter 1 and a motor M1 is not installed in FIG. 4. Consequently, terminals U1, V1 and W1 of the motor M1 are directly connected to the power converter 1 via connection lines Lu, Lv and Lw.

In the synchronous motor drive device 50, such as that in Embodiment 3, the motor M1 is directly connected to the power converter 1 not via switch SW and having power supply that is not cut off is a parent motor M. On the other hand, another motor M (e.g., a motor M2 of two motors) is a child motor M in which the power supply is selectively cut off and driving is stopped.

In the synchronous motor drive device 50 having the above described configuration, installation of the switch SW1 installed in Embodiment 1 can be omitted. This can decrease component cost. This also applies when three or more motors M are connected in parallel.

Embodiment 4

Figure 5:
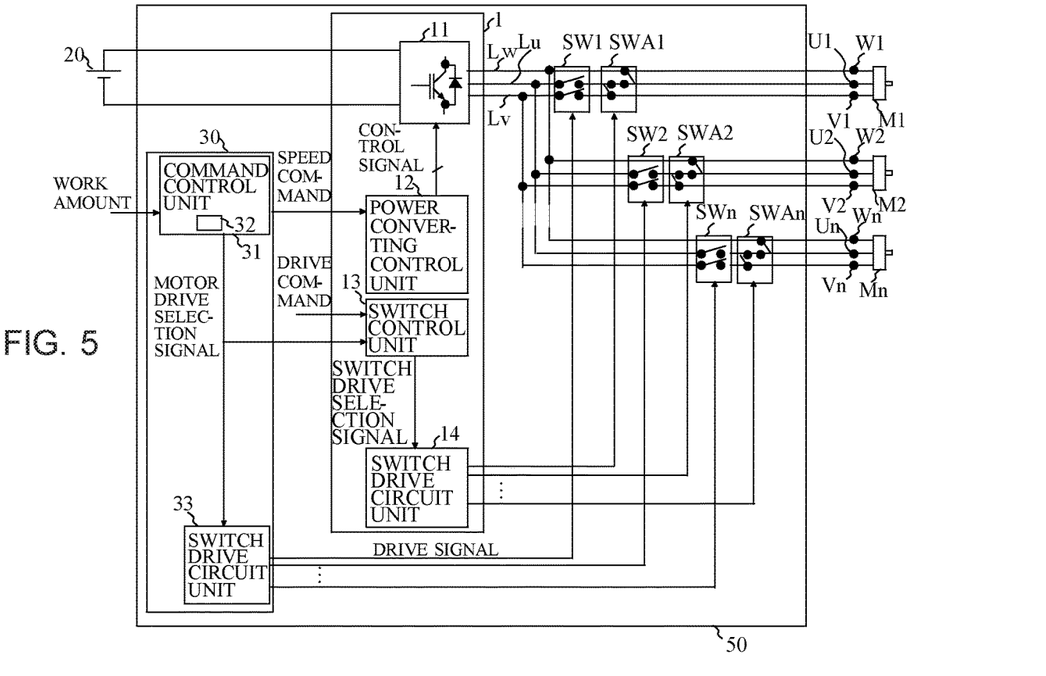
FIG. 5 is a diagram showing an example of a system configuration mainly including a synchronous motor drive device 50 according to Embodiment 4 of the present invention.

FIG. 5 is a diagram showing an example of a system configuration mainly including a synchronous motor drive device 50 according to Embodiment 4 of the present invention. In FIG. 5, for example, equipment denoted by the same reference sign as in FIG. 1 performs an operation similar to the operation described in Embodiment 1. In the synchronous motor drive device 50 of Embodiment 4, a power converter 1 has a switch control unit 13 and a switch drive circuit unit 14. Then, each of switches SWA1, SWA2 to SWAn each having two switching units is installed between each of switches SW1, SW2 to SWn and each of motors M1, M2 to Mn. Here, when the switches SWA1, SWA2 to SWAn are not specified, the switches will be described as switches SWA. The switches SWA are second switch devices having a function of short-circuiting terminals U, V and W of each motor M.

For example, when supply of drive power to the motor M is stopped on wind conditions, a fan that sends air to a heat exchanger of an air-conditioning device comes in a free run state where the fan can rotate freely in accordance with a wind speed of the wind. It is technically possible to start the fan as it is from the free run state, but control algorithm tends to be complicated. To simplify the control algorithm, the fan rotated by the wind may be once decelerated or stopped before started. An example of a decelerating method includes turning on all phases of a lower arm of a power converting circuit unit 11. However, when this method is used during high-speed rotation, a large current flows through the motor M or an inverter circuit, and there is concern that the device malfunctions. In the synchronous motor drive device 50, when a plurality of motors M are simultaneously stopped from the free run state, the current further increases, and increases risk of the malfunction. Consequently, measures need to be taken.

As the measures, two methods are considered. A first measure includes decelerating each motor M in order. For example, when the motor M1 and the motor M2 are in the free run state, the switch SW1 is first turned on, the switch SW2 is turned off, and the other switches SWn are all turned off. In this state, all the phases of the lower arm of the power converting circuit unit 11 are turned on. Consequently, the motor M1 is decelerated. After end of the deceleration of the motor M1, the switch SW1 is turned off, the switch SW2 is turned on, and the motor M2 is decelerated. To prevent the motor M1 from speeding up due to the wind while decelerating the motor M2, the switch SWA1 is turned on to short-circuit terminals U1, V1 and W1 of the motor M1. After all the motors M are decelerated, the switches SWA are turned off, and the switches SW are turned on, thereby shifting to processing of stopping all the motors M.

A second measure includes always turning on the switches SWA and turning off the switches SW when the motors M are not driven. When all the phases of the lower arm of the power converting circuit unit 11 are turned on and the terminals U, V and W of each motor M are short-circuited, the large current flows. This is because the motors M rotate at a high speed and generate a large induced voltage. Therefore, when the switch SWA is turned on and the switch SW is turned off for the motor M that does not need to be rotated, there is a low possibility that the motor speeds up to a high speed rotation region due to the wind.

The switch control unit 13 determines the motor M to be stopped from a driven state and the motor M to be driven from a stopped state, based on an operation command signal and a motor drive selection signal. Then, a switch drive signal including data of the determined result is sent to the switch drive circuit unit 14. Based on the data of the determined result, the switch drive circuit unit 14 determines the switch SWA to be turned off from an on state and the switch SWA to be turned on from an off state, and sends a drive signal to the determined switch SWA. The switch SWA to which the drive signal is sent turns on or off the switching unit. Here, it is described that the power converter 1 has the switch control unit 13 and the switch drive circuit unit 14. However, for example, a controller 30 may have these units.

Thus, the device includes the switch SWA that short-circuits the terminals U, V and W of each motor M and appropriately turns on or off the switch SWA, so that the motor M in the free run state can be safely decelerated or stopped. In FIG. 5, all the motors M are provided with the switches SWA, but the number of the switches SWA may be decreased as required. For example, in a device configuration of the device of Embodiment 3 combined with the device of Embodiment 4, the switch SWA1 may be omitted.

Here, the configuration of the synchronous motor drive device 50 in Embodiment 4 can be an independent device configuration regardless of content of control processing performed by the controller 30 described in Embodiment 1 or other embodiments.

Embodiment 5

Figure 6:
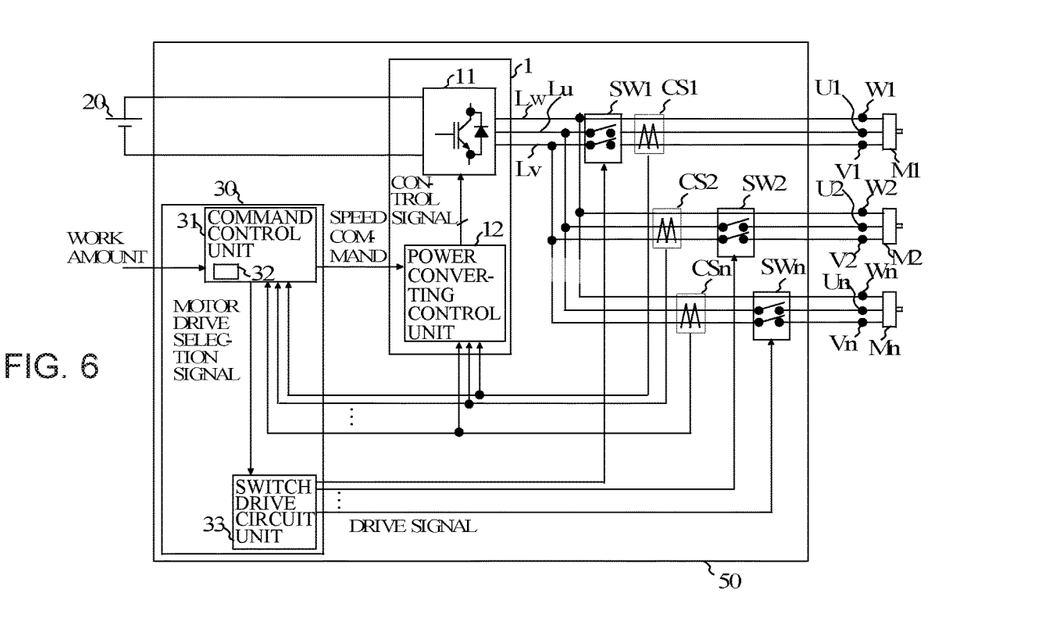
FIG. 6 is a diagram showing an example of a system configuration mainly including a synchronous motor drive device 50 according to Embodiment 5 of the present invention.

FIG. 6 is a diagram showing an example of a system configuration mainly including a synchronous motor drive device 50 according to Embodiment 5 of the present invention. In FIG. 6, for example, equipment denoted by the same reference sign as in FIG. 1 performs an operation similar to the operation described in Embodiment 1. In FIG. 6, each of current detection devices CS1, CS2 to CSn detects, as a current detection value, a phase current flowing through each terminal of each of motors M1, M2 to Mn. Then, the device sends a signal including the current detection value to a power converting control unit 12 and a command control unit 31. The power converting control unit 12 uses the current detection value to perform processing that follows a speed command. Furthermore, the command control unit 31 performs stability judgment processing of each motor M, based on the current detection value.

Figure 7:
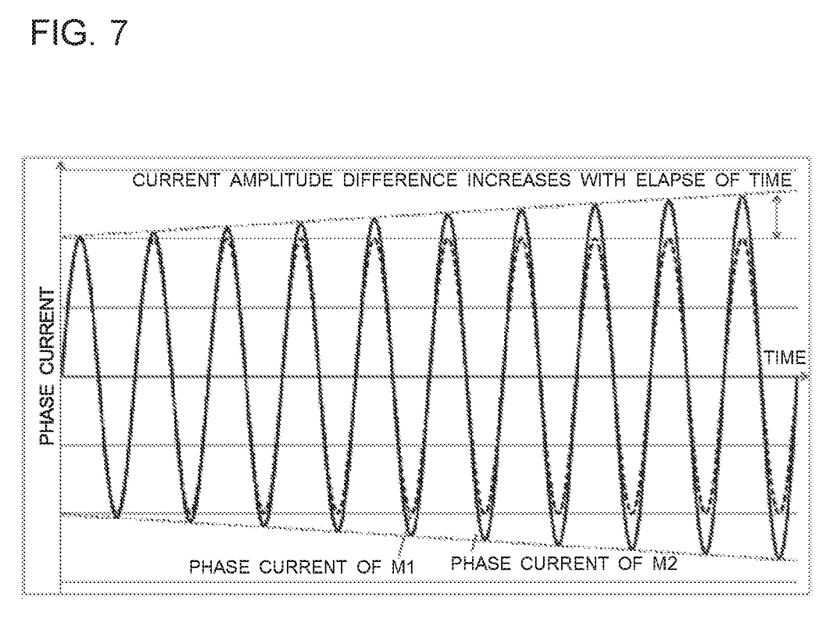
FIG. 7 is a diagram schematically showing a phase current flowing through a motor M during transition from a stable state to an unstable state.

FIG. 7 is a diagram schematically showing the phase current flowing through the motor M during transition from a stable state to an unstable state. Here, phase current widths in the motor M1 and the motor M2 will be described. For example, when each motor M is stably driven, there is almost no difference between the phase current flowing through the motor M1 and the phase current flowing through the motor M2. However, after the transition to the unstable state, with elapse of time, the difference is made between the widths of the phase currents flowing through the motor M1 and the motor M2, a difference is made in torque and the motors are unstably driven. At worst, the motors may step out. In FIG. 7, the width of the phase current flowing through the motor M2 broadens. Consequently, a difference is also generated in current effective value. To solve the problem, in Embodiment 5, when the device detects the current flowing through each motor M and judges, based on the phase current width obtained from the current detection value, that the motor M is unstably driven, then one motor M is only subtracted from the motors, and the other motors are driven. Then, a speed of each motor M is increased. Consequently, behaviors of the motors can be stabilized.

Figure 8:
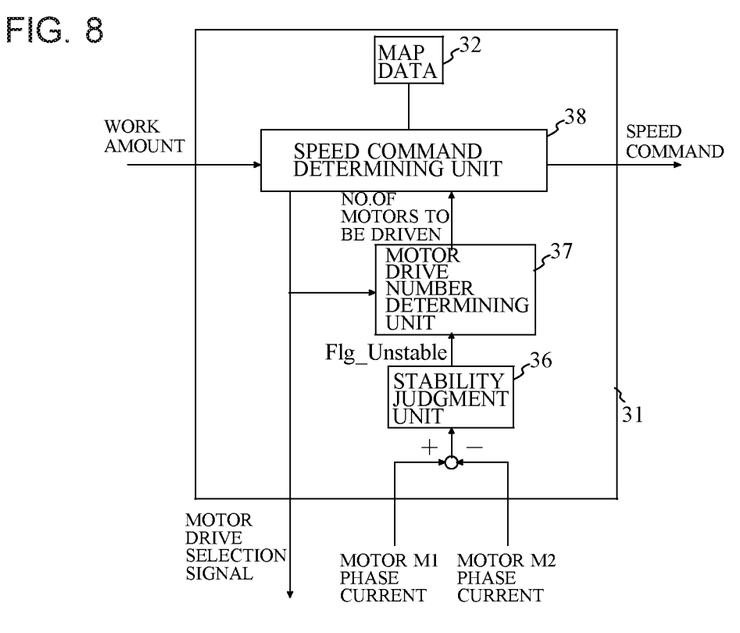
FIG. 8 is a block diagram showing a configuration of a command control unit 31 according to Embodiment 5 of the present invention.

FIG. 8 is a block diagram showing a configuration based on the processing of the command control unit 31 according to Embodiment 5 of the present invention. A stability judgment unit 36 performs stability judgment processing of judging whether the motors M are stably or unstably driven, based on the difference in the current effective value obtained from the difference between the phase currents of the respective motors M. For example, the unit determines an instability detection flag Flg_Unstable as shown in the following equation (1). Here, $\alpha$ is a predetermined threshold value.

[Equation 1]

$$\text{If } (Iu\_rms < \alpha) \quad (1)$$

$$Flg\_Unstable = 0$$

$$\text{Else if } (Iu\_rms > \alpha)$$

$$Flg\_Unstable = 1$$

Furthermore, a motor drive number determining unit 37 determines the number of motors M to be driven (one or two in Embodiment 5) based on Flg_Unstable of each motor M determined by the stability judgment unit 36. When it is judged that at least one motor M is unstably driven, one motor is only subtracted from the motors M to drive the motor to be driven. In Embodiment 5, it is selected whether to drive the motor M1 or to drive the motor M1 and the motor M2.

Figure 9:
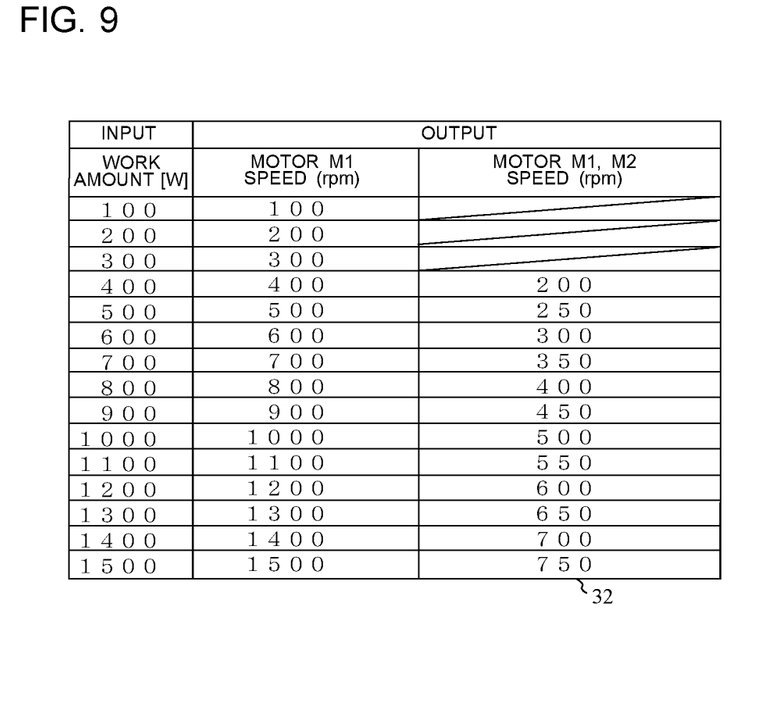
FIG. 9 is a diagram explaining content of map data 32 owned by the command control unit 31, according to Embodiment 5 of the present invention.

FIG. 9 is a diagram explaining content of map data 32 that the command control unit 31 has, according to Embodiment 5 of the present invention. A speed command determining unit 38 determines a drive speed of the motor M to be driven with reference to the map data 32 shown in FIG. 9, and sends the speed command to a power converter 1. The unit also sends a motor drive selection signal including data concerning the selected motor M to a switch drive circuit unit 33.

Here, there are not any special restrictions on a method in which the current detection device CS detects the current. For example, the phase current of each motor M may be detected directly with, for example, a hall CT or a shunt resistor. Here, when the phase current of each motor M is detected with the hall CT, the current detection device may directly detect the current in two connection lines (connection lines Lu and Lv in FIG. 6) in branched connection lines Lu, Lv and Lw.

Furthermore, the current flowing through the connection line before branched is detected with the hall CT, and hence, a total of the phase currents flowing through the respective phases of all the motors M can be detected. Then, the phase current flowing through the branched connection line to the motor M2 is detected with the hall CT. For example, a value of the phase current flowing through the branched connection line to the motor M1 can be obtained from a difference between a total current detection value and the current detection value of the phase current flowing through each phase of the motor M2.

Here, when the current detection device can detect a total of the currents flowing through the respective phases of the motors M, the device can detect the current of each motor M in addition to the detection of the current of the connection line before branched with the hall CT. For example, the current may be detected with one shunt resistor inserted in a ground side line of DC link. Alternatively, the currents of the respective phases may be individually detected with a shunt resistor inserted between a switching element disposed on a low side of a power converting circuit unit 11 and the ground side line of the DC link.

Embodiment 6

Figure 10:
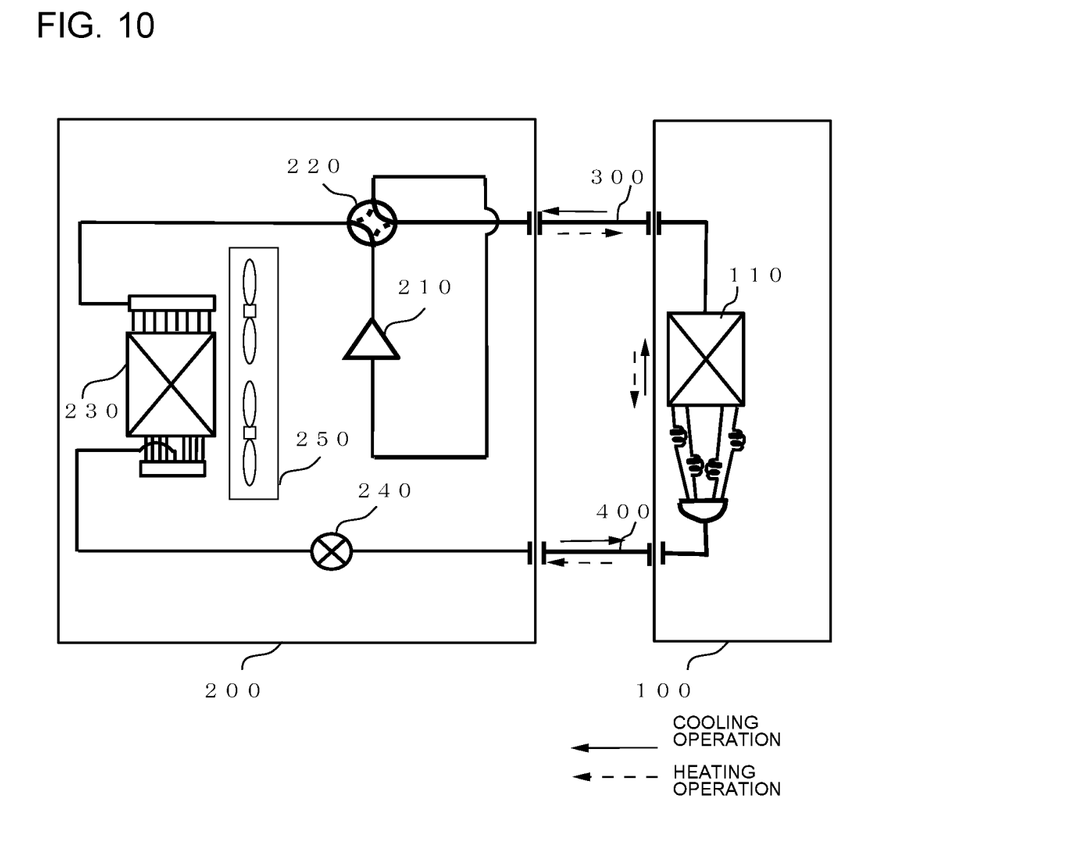
FIG. 10 is a diagram showing a configuration example of an air-conditioning device according to Embodiment 6 of the present invention.

FIG. 10 is a diagram showing a configuration example of an air-conditioning device according to Embodiment 6 of the present invention. Here, FIG. 10 shows the air-conditioning device as an example of a refrigeration cycle device. The air-conditioning device evaporates, compresses, condenses and expands refrigerant. While changing a phase of the refrigerant from a liquid to a gas and from the gas to the liquid, the refrigerant is circulated, heat is moved to the refrigerant, and air of a target space is conditioned.

In the air-conditioning device of FIG. 10, an outdoor unit 200 and an indoor unit 100 are connected by a gas refrigerant pipe 300 and a liquid refrigerant pipe 400. The outdoor unit 200 has a compressor 210, a four-way valve 220, an outdoor heat exchanger 230, an expansion valve 240 and an outdoor fan 250.

The compressor 210 compresses and discharges the suctioned refrigerant. Here, although not especially limited, the compressor 210 may arbitrarily change an operation frequency, for example, by an inverter circuit, to change a capacity (an amount of the refrigerant to be sent outside per unit time) of the compressor 210. The four-way valve 220 is a valve that switches flow of the refrigerant, for example, at a cooling operation time and at a heating operation time.

The outdoor heat exchanger 230 in the present embodiment exchanges heat between the refrigerant and air (outdoor air). For example, during a heating operation, the outdoor heat exchanger functions as an evaporator to evaporate and gasify the refrigerant. Furthermore, during a cooling operation, the outdoor heat exchanger functions as a condenser to condense and liquefy the refrigerant. The outdoor air-sending device 250 sends air into the outdoor heat exchanger 230. The outdoor fan 250 has a plurality of fans, and the respective fans are driven by motors M. Rotation driving of the fans of the outdoor fan 250 is controlled by a motor drive device of any one of Embodiment 1 to Embodiment 5 described above.

The expansion valve 240, such as an expansion device (a flow rate control unit), decompresses and expands the refrigerant. For example, when the expansion valve includes an electronic expansion valve, an opening degree is regulated based on an instruction of, for example, a controller (not shown).

Furthermore, the indoor unit 100 has an indoor heat exchanger 110. For example, the indoor heat exchanger 110 exchanges heat between air of an air-conditioning target and the refrigerant. During the heating operation, the indoor heat exchanger functions as a condenser to condense and liquefy the refrigerant. Furthermore, during the cooling operation, the indoor heat exchanger functions as an evaporator to evaporate and gasify the refrigerant.

INDUSTRIAL APPLICABILITY

A synchronous motor drive device 50 according to the present embodiment drives a plurality of motors connected in parallel by one current supply unit. The drive device can be applied to various drive devices. For example, an operation environment such as a load or a temperature changes while optional motors or all the motors are operated. Even in this case, the motors can be prevented from falling in an unstable state or stepping out, the motors can be operated with an optimum performance concerned with sound, loss or the like, and the plurality of motors connected in parallel are driven by one current supply unit.

REFERENCE SIGNS LIST 1 power converter, 11 power converting circuit unit, 12 power converting control unit, 13 switch control unit, 14 switch drive circuit unit, 20 DC voltage power source, 30 controller, 31 command control unit, 32 map data, 33 switch drive circuit unit, 34 processor, 35 memory, 36 stability judgment unit, 37 motor drive number determining unit, 38 speed command determining unit, 50 synchronous motor drive device, 100 indoor unit, 110 indoor heat exchanger, 200 outdoor unit, 210 compressor, 220 four-way valve, 230 outdoor heat exchanger, 240 expansion valve, 250 outdoor fan, 300 gas refrigerant pipe, 400 liquid refrigerant pipe, CS and CS1 to CSn current detection device, Lu, Lv and Lw connection line, M and M1 to Mn motor, SW, SW1 to SWn, SWA and SWA1 to SWAn switch, and U, U1 to Un, V, V1 to Vn, W and W1 to Wn terminal.

The invention claimed is:

1. A synchronous motor drive device that drives a plurality of synchronous motors connected in parallel to one another, comprising:

a power converter that converts power from a power source to supply the power to the plurality of synchronous motors, a first switch device that electrically connects or disconnects the power converter and each of the plurality of synchronous motors, and a controller, based on a higher order command containing a work amount, configured to:

perform stability judgment processing of the plurality of synchronous motors based on relationship in phase current flowing through each of the plurality of synchronous motors for the work amount, determine a number of synchronous motors to be driven and a total drive speed from among the plurality of synchronous motors to generate the work amount, select a synchronous motor corresponding to the number of the synchronous motors to be driven from among the plurality of synchronous motors to generate the work amount, control the first switch device corresponding to the selected synchronous motor to electrically connect the power converter to the synchronous motor and to supply the power, and output a signal containing the total drive speed of the synchronous motor to be driven, wherein the controller is further configured to determine that a single motor is to be driven in response to the work amount being below a predetermined work amount and determine that multiple motors are to be driven in response to the work amount being above a predetermined work amount, and the controller is further configured to allocate a portion of the total drive speed to each of the multiple motors to be driven in response to determining that multiple motors are to be driven and allocate the total drive speed to the single motor in response to determining that only the single motor is to be driven.

2. The synchronous motor drive device of claim 1, wherein, among the plurality of synchronous motors, one of the plurality of synchronous motors is directly connected to the power converter without installing the first switch device between the one synchronous motor and the power converter.

3. The synchronous motor drive device of claim 1, wherein, among the plurality of synchronous motors, one phase is directly connected to the power converter.

4. The synchronous motor drive device of claim 1, further comprising a second switch device that electrically connects each phase of the synchronous motor electrically disconnected from the power converter by the first switch device.

5. The synchronous motor drive device of claim 1, comprising a current detection device that detects a current flowing through the plurality of synchronous motors.

6. The synchronous motor drive device of claim 5, wherein the controller performs the stability judgment processing from difference in phase current flowing through each of the plurality of synchronous motors.

7. An air-sending device fan comprising:

the synchronous motor drive device of claim 1, a plurality of synchronous motors connected in parallel to one another, and a plurality of fans to be rotated and driven by driving each of the plurality of synchronous motors.

8. An air-conditioning device comprising:

the air-sending device of claim 7, a heat exchanger that exchanges heat between air sent by the fan and refrigerant, and a compressor that sends the refrigerant to the heat exchanger.

9. The synchronous motor drive device of claim 1, wherein, when the controller determines that at least one of the synchronous motors is driven unstably, the controller instructs to subtract one motor from the synchronous motors and drive other motors, and to increase the speed of each of the plurality of synchronous motors.

10. The synchronous motor drive device of claim 1, wherein, when the controller determines to increase the number of the synchronous motors to be driven, the controller instructs to decrease the driving speed of the synchronous motors.

11. A synchronous motor drive device that drives a plurality of synchronous motors connected in parallel to one another, comprising:

a power converter that converts power from a power source to supply the power to the plurality of synchronous motors, a first switch device that electrically connects or disconnects the power converter and each of the plurality of synchronous motors, a second switch device that electrically connects each phase of the synchronous motor electrically disconnected from the power converter by the first switch device, and a controller configured to determine a motor to be stopped from a driven state and a motor to be driven from a stopped state, allows the second switch corresponding to the plurality of synchronous motors to electrically connect each phase, and allows the second switch corresponding to the plurality of motors to be driven to electrically disconnect each phase.

* * * * *